United States Patent
Inaoka et al.

(10) Patent No.: US 11,105,145 B2
(45) Date of Patent: Aug. 31, 2021

(54) GLASS PANEL

(71) Applicant: NIPPON SHEET GLASS COMPANY, LIMITED, Tokyo (JP)

(72) Inventors: Daisuke Inaoka, Tokyo (JP); Masafumi Taguchi, Tokyo (JP); Kazuya Fujino, Tokyo (JP); Tetsuo Minaai, Tokyo (JP)

(73) Assignee: NIPPON SHEET GLASS COMPANY, LIMITED, Tokyo (JP)

( * ) Notice: Subject to any disclaimer, the term of this patent is extended or adjusted under 35 U.S.C. 154(b) by 0 days.

(21) Appl. No.: 16/761,719

(22) PCT Filed: Nov. 6, 2018

(86) PCT No.: PCT/JP2018/041176
§ 371 (c)(1),
(2) Date: May 5, 2020

(87) PCT Pub. No.: WO2019/093319
PCT Pub. Date: May 16, 2019

(65) Prior Publication Data
US 2020/0340293 A1    Oct. 29, 2020

(30) Foreign Application Priority Data
Nov. 10, 2017 (JP) .............. JP2017-217839

(51) Int. Cl.
*E06B 3/663* (2006.01)
*C03C 27/06* (2006.01)
(Continued)

(52) U.S. Cl.
CPC .......... *E06B 3/66342* (2013.01); *C03C 27/06* (2013.01); *E06B 3/677* (2013.01);
(Continued)

(58) Field of Classification Search
CPC .... E06B 3/66342; E06B 3/6612; E06B 3/677; Y02B 80/22; Y02A 30/249
See application file for complete search history.

(56) References Cited

U.S. PATENT DOCUMENTS

2002/0121111 A1*  9/2002  Yoshizawa ............ E06B 3/6775
                                                              65/34
2003/0108692 A1   1/2003  Domi et al.

FOREIGN PATENT DOCUMENTS

| JP | 2002-187743 A | 7/2002 |
| JP | 2011-068532 A | 4/2011 |
| WO | WO-2002/044097 A1 | 6/2002 |

OTHER PUBLICATIONS

Machine translation of applicant cited JP 2011-068532 (Year: 2011).*

(Continued)

*Primary Examiner* — Donald J Loney
(74) *Attorney, Agent, or Firm* — Michael Best & Friedrich LLP

(57) ABSTRACT

Provided is a glass panel capable of, even after elapse of a long period, reliably sealing a suction hole and keeping a gap in an airtight state. A suction hole sealing metal material 15 has a first protruding portion 15a formed on an atmospheric side around a suction hole 4, and a second protruding portion 15b formed on a gap side around the suction hole 4, and as seen in a thickness direction of the glass plates 1A, 1B, a first contour 16a which is an outermost edge of a first adhesion surface portion S1 where the first protruding portion 15a is in contact with an atmospheric-side surface 17A of the glass plate 1A, and a second contour 16b which is an outermost edge of a second adhesion surface portion S2 where the second protruding portion 15b is in contact with (Continued)

a gap-side surface 17B of the glass plate 1A, are on an outer side of a third contour 16c which is a gap-side hole edge of the suction hole 4.

13 Claims, 9 Drawing Sheets

(51) Int. Cl.
*E06B 3/677* (2006.01)
*E06B 3/66* (2006.01)
(52) U.S. Cl.
CPC ........... *E06B 3/6612* (2013.01); *Y02A 30/249* (2018.01); *Y02B 80/22* (2013.01)

(56) References Cited

OTHER PUBLICATIONS

International Search Report issued in Application No. PCT/JP2018/041176, dated Feb. 12, 2019.

* cited by examiner

GLASS PANEL

TECHNICAL FIELD

The present invention relates to a glass panel. More specifically, the present invention relates to a glass panel including: a pair of glass plates opposed to each other; a gap formed by a plurality of spacers being provided at a constant pitch between the pair of glass plates; and a periphery sealing metal material joining the pair of glass plates at a peripheral portion thereof so as to seal the gap in an airtight state, wherein one of the pair of glass plates has a suction hole penetrating in a plate thickness direction and for sucking gas in the gap, and a suction hole sealing metal material sealing the suction hole in a state in which the gap is depressurized.

BACKGROUND ART

Conventionally, as an example of such a glass panel described above, a glass panel described in PATENT DOCUMENT 1 has been known. In this glass panel, a gap is formed by a plurality of spacers being provided at a constant pitch between a pair of glass plates, and after the gap is made airtight, gas in the gap is sucked through a suction hole and the suction hole is sealed, whereby the gap is depressurized. However, reliability of the sealing of the suction hole has not been evaluated, and there is still room for studying durability of the sealing effect over a long period.

CITATION LIST

Patent Documents

[PATENT DOCUMENT 1] Japanese Laid-Open Patent Publication No. 2002-187743

SUMMARY OF THE INVENTION

Problems to be Solved by the Invention

Considering the conventional circumstances as described above, an object of the present invention is to provide a glass panel capable of, even after elapse of a long period, reliably sealing a suction hole and keeping a gap in an airtight state.

Solution to the Problems

In order to attain the above object, a glass panel according to the present invention includes: a pair of glass plates opposed to each other; a gap formed by a plurality of spacers being provided at a constant pitch between the pair of glass plates; and a periphery sealing metal material joining the pair of glass plates at a peripheral portion thereof so as to seal the gap in an airtight state. One of the pair of glass plates has a suction hole penetrating in a plate thickness direction and for sucking gas in the gap, and a suction hole sealing metal material sealing the suction hole in a state in which the gap is depressurized. The suction hole sealing metal material has a first protruding portion formed on an atmospheric side around the suction hole, and a second protruding portion formed on a gap side around the suction hole. As seen in a thickness direction of the glass plate, a first contour which is an outermost edge of a first adhesion surface portion where the first protruding portion is in contact with an atmospheric-side surface of the glass plate, and a second contour which is an outermost edge of a second adhesion surface portion where the second protruding portion is in contact with a gap-side surface of the glass plate, are on an outer side of a third contour which is a gap-side hole edge of the suction hole.

As shown in FIGS. 7 to 10, in the above configuration, the first contour 16a which is an outermost edge of the first protruding portion 15a is on the outer side of the third contour 16c which is the gap-side edge of the suction hole portion 15c. Therefore, by cooling, solder contraction stress Fa1 occurs in the first protruding portion 15a. Since the thermal expansion coefficient of the glass plate 1A is smaller than that of the suction hole sealing metal material 15, compressive stress Fa2 occurs in the vicinity of the atmospheric-side surface 17A. As a reaction force to Fa2, tensile stress Fa occurs in the vicinity of the gap-side surface 17B.

Similarly, the second contour 16b which is an outermost edge of the second protruding portion 15b is on the outer side of the third contour 16c. Therefore, by cooling, solder contraction stress Fb1 occurs in the second protruding portion 15b, so that compressive stress Fb2 occurs in the vicinity of the gap-side surface 17B. Thus, in stress occurring in the vicinity of the gap-side surface 17B of the glass plate 1A, the compressive stress Fb2 relaxes the tensile stress Fa, so that tensile stress occurring in the vicinity of the gap-side surface 17B of the glass plate 1A is reduced, whereby durability of the glass plate 1A is improved.

It is desirable that the first contour is on an outer side of the second contour.

Since the first contour 16a is on the outer side of the second contour 16b, at least a part of the first adhesion surface portion S1 between the first protruding portion 15a and the glass plate 1A can be visually confirmed through the glass plate 1B having no suction hole 4. Therefore, the degree of close adhesion of the first adhesion surface portion S1 can be confirmed, whereby a glass panel P having a poor degree of close adhesion can be considered not to meet the standard and thus can be excluded. As a result, it is possible to obtain, as a product, only the glass panel P that is excellent in the degree of close adhesion and is capable of, even after elapse of a long period, sealing the suction hole 4 and keeping the gap V in a depressurized state.

It is desirable that, in a contact surface between the first protruding portion and the glass plate, white haze is not in contact with at least the first contour or the second contour. This white haze 18 is a part where the suction hole sealing metal material 15 and the glass plate are not closely adhered to each other for some reasons. If the white haze 18 exists over a range between the gap side and the atmospheric side of the glass panel, the white haze serves as a communication portion, so that it is highly likely that the depressurized state of the gap cannot be kept. Accordingly, as shown in FIG. 11(b), if the white haze 18 is not in contact with at least the first contour 16a or the second contour 16b, it is ensured that, in the contact surface between the suction hole sealing metal material 15 and the glass plate, there is no white haze that exists over a range between the gap side and the atmospheric side of the glass panel. Thus, it becomes possible to keep the depressurized state of the gap after elapse of a further long period.

It is desirable that a diameter of the suction hole is 2 to 10 mm. If the diameter of the suction hole is large, the tensile stress per unit area is small, and thus it becomes possible to prevent occurrence of crack.

It is desirable that a viscosity of the suction hole sealing metal material at a melting point thereof is 4 mPa·s or lower, and a surface tension thereof is 300 to 600 mN/m. The viscosity and the surface tension of the suction hole sealing metal material 15 greatly influence formation of the first protruding portion and the second protruding portion.

It is desirable that at least a lower edge portion of the suction hole is formed in a curved-surface shape or is chamfered. It is considered that, if the edge portion is formed in a curved-surface shape or is chamfered, stress is dispersed as compared to the case where the edge portion is formed in a rectangular shape.

It is desirable that a width of the periphery sealing metal material as seen in the thickness direction with respect to a plane of the glass panel is 1 to 10 mm.

It is desirable that a thickness of at least one of the pair of glass plates is 0.3 to 15 mm.

It is desirable that a width of the first protruding portion is 2 to 30 mm.

It is desirable that a thickness of the first protruding portion is 0.1 to 20 mm.

It is desirable that the pitch of the spacers is 5 to 100 mm.

It is desirable that a diameter of the suction hole is 2 to 10 mm.

Advantageous Effects of the Invention

The above configuration of the glass panel according to the present invention enables the gap to be kept in a depressurized state even after elapse of a long period, thus achieving long-term durability.

DESCRIPTION OF EMBODIMENTS

Hereinafter, embodiments of the present invention will be described with reference to the drawings.

Figure 1:
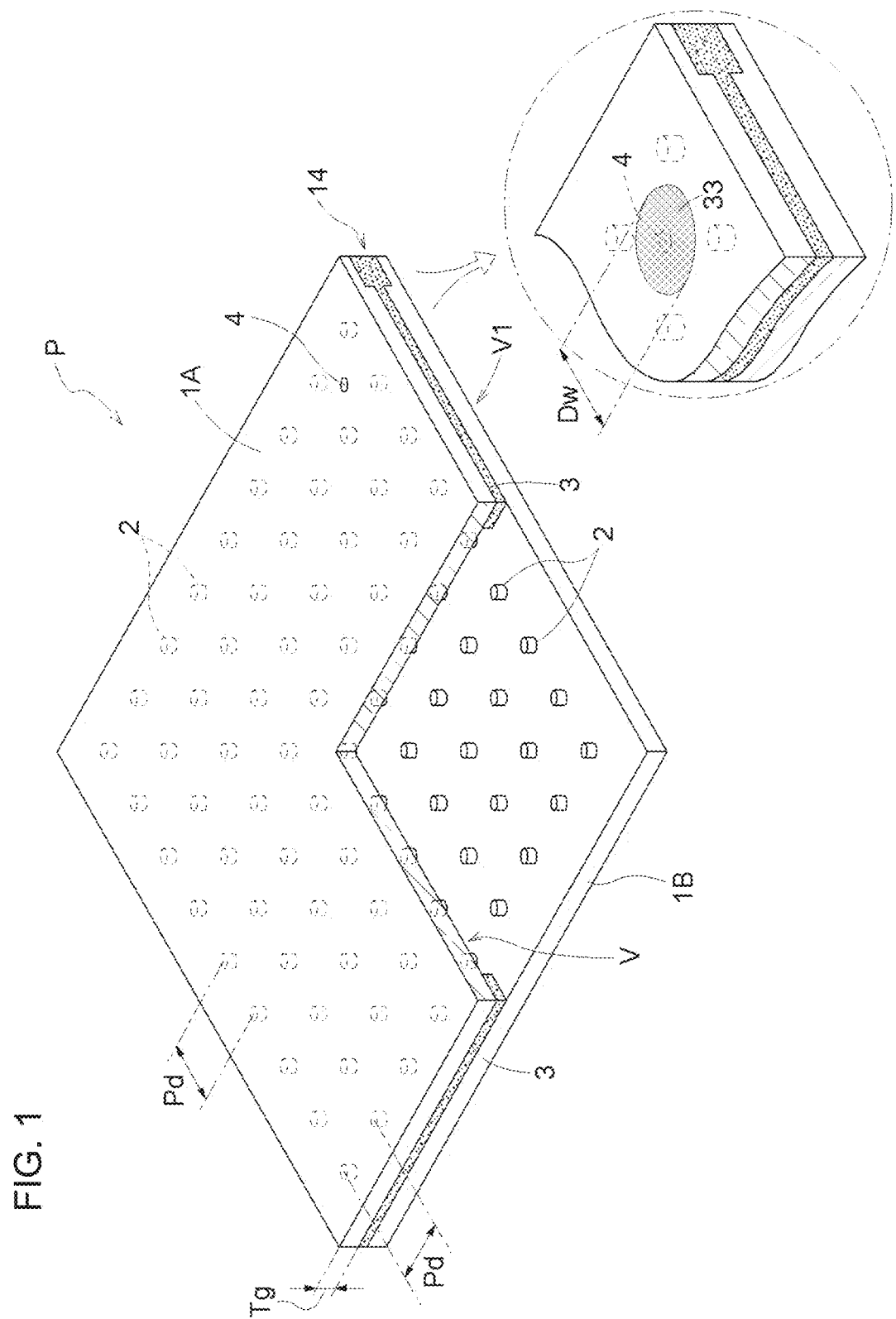
FIG. 1 is a partially cutaway perspective view of a glass panel.
Figure 2:
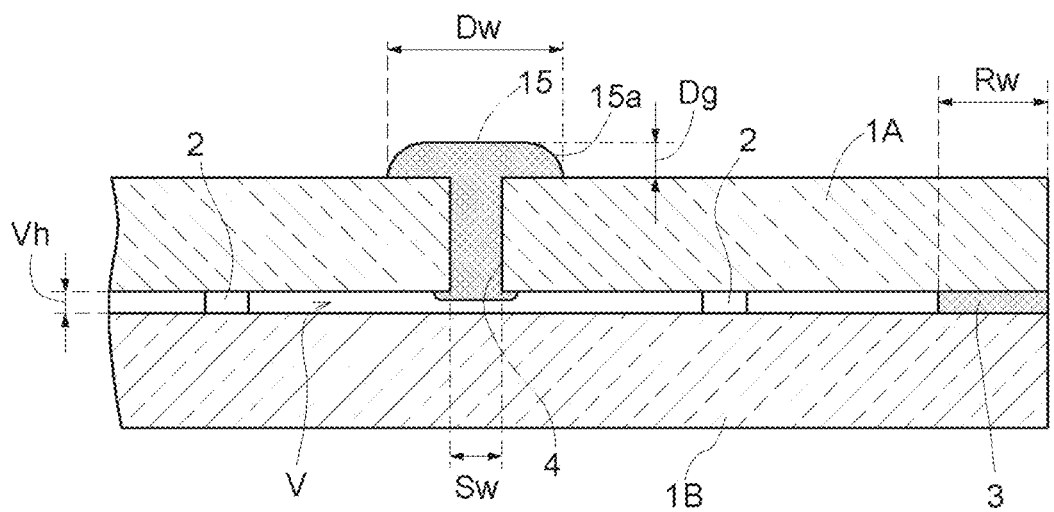
FIG. 2 is a vertical sectional view around a suction hole of the glass panel.

In FIG. 1, a glass panel P includes a pair of glass plates 1A, 1B opposed to each other, a gap V formed by a plurality of columnar spacers 2 being provided at a constant spacer pitch Pd in a matrix form between the pair of glass plates 1A, 1B, a periphery sealing metal material 3 sealing a peripheral portion V1 of the gap V, and a suction hole 4 penetrating one glass plate 1A of the pair of glass plates 1A, 1B. The suction hole 4 is sealed by a suction hole sealing metal material 15 covering the suction hole 4 including a surrounding area thereof.

In the glass panel P, the two glass plates 1A, 1B are transparent float glass, and the gap V is depressurized to 1.33 Pa ($1.0 \times 10^{-2}$ Torr) or lower. Here, the gap V is depressurized by discharging the inside air through the suction hole 4, and is sealed by the periphery sealing metal material 3 and the suction hole sealing metal material 15 in order to maintain the depressurized state of the gap V.

Each spacer 2 has a columnar shape, and has a diameter of approximately 0.3 to 1.0 mm and a height of approximately 30 μm to 1.0 mm. The spacer 2 is made from a material that does not buckle even when being subjected to compressive stress due to the atmospheric pressure applied to the glass plates 1A, 1B, e.g., a material having a compressive strength of $4.9 \times 10^8$ Pa ($5 \times 10^3$ kgf/cm$^2$) or greater, and preferably, stainless steel (SUS304) or the like.

Figure 3:
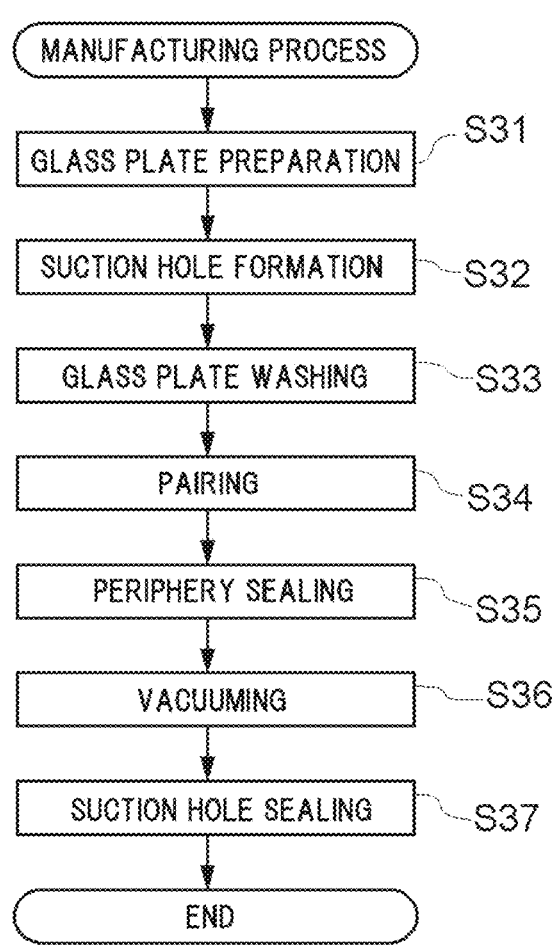
FIG. 3 is a flowchart showing a method for manufacturing the glass panel.

FIG. 3 is a flowchart showing a method for manufacturing the glass panel P shown in FIG. 1.

First, two glass raw plates (not shown) made from float glass and having a predetermined thickness are each cut in predetermined dimensions, e.g., 1200 mm×900 mm, to prepare the glass plates 1A, 1B having the same shape and the same size (step S31), and the glass plate 1A is perforated in the vicinity of one of the four corners thereof by a drill or the like, to form the suction hole 4 (step S32) (perforation step).

Next, in a space such as a clean room or a chemical clean room in which the contamination state of air can be chemically or physically controlled, the pair of glass plates 1A, 1B are cleaned using at least one of pure water brush cleaning, a liquid cleaning method, and optical cleaning (step S33) (cleaning step). In this liquid cleaning method, pure water, deionized water, or the like is used. In addition, a cleaning liquid contains an alkaline detergent or ozone water, for example. In addition, the cleaning liquid may contain a polishing agent. As the polishing agent, for example, fine particles containing cerium oxide as a main component are used.

On the glass plate 1B which has no suction hole 4 and has been cleaned, a plurality of spacers 2 are arranged at a constant spacer pitch Pd in a matrix form, and the cleaned glass plate 1A is overlaid thereon, whereby the glass plates 1A, 1B are paired (step S34).

Further, while the paired glass plates 1A, 1B are kept substantially horizontal, the peripheral portion V1 of the pair of glass plates 1A, 1B is sealed using the periphery sealing metal material 3 having a melting temperature of 250° C. or lower (step S35) (periphery sealing).

Figure 4:
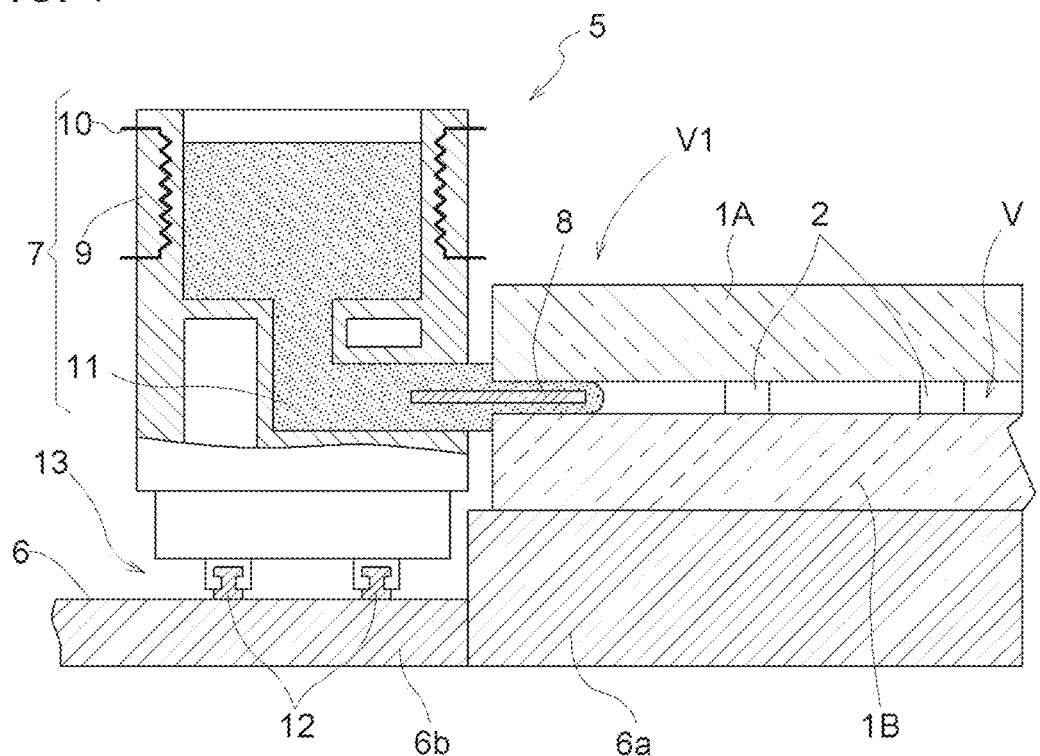
FIG. 4 is a major part vertical sectional view showing a periphery sealing step.

FIG. 4 is a view used for explaining the periphery sealing in step S35 in FIG. 3.

In FIG. 4, a metal introduction device 5 has a surface plate 6 having a high portion 6a and a low portion 6b lower than the high portion 6a so as to be formed in a step shape. The pair of glass plates 1A, 1B are retained on the high portion 6a, and a supply tower 7 for supplying solder to the pair of glass plates 1A, 1B is retained on the low portion 6b. On the low portion 6b of the stepped surface plate 6, two rail members 12 are arranged along the pair of glass plates 1A, 1B, and the supply tower 7 is placed on a movement mechanism 13 which moves on the rail members 12.

The supply tower 7 includes a crucible portion 9 which stores solder in liquid phase or solid phase and has a rectangular cross-section, an electric heater 10 which is provided inside a side wall portion of the crucible portion 9 and heats solder stored in the crucible portion 9, an introduction path 11 which has an elongated sectional shape and which communicates with a bottom portion of the crucible portion 9 and opens toward an outer side of the peripheral portion V1 of the pair of glass plates 1A, 1B, and an introduction plate 8 provided horizontally at a middle level in the introduction path 11. The introduction plate 8 extends from the introduction path 11, to be inserted into the peripheral portion V1 of the pair of glass plates 1A, 1B. Thus, solder moves into the gap V with the aid of the surface tension thereof. In addition, the weight of solder at a liquid level ΔH in the crucible portion 9 is applied to solder at the introduction plate 8 part, thereby promoting the solder to move into the peripheral portion V1 of the pair of glass plates 1A, 1B.

Figure 5:
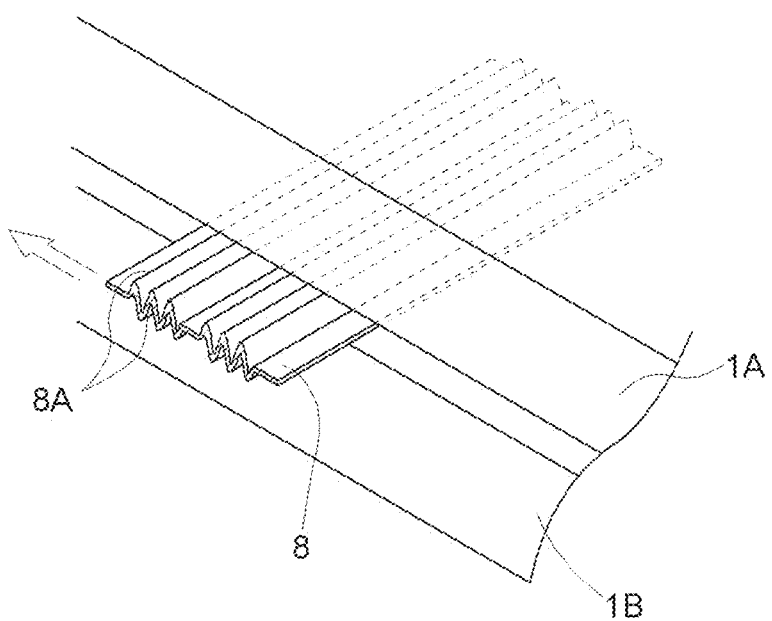
FIG. 5 illustrates an action of an introduction plate.

In addition, as shown in FIG. 5, the introduction plate 8 may have such a shape that bent portions 8A each waved up and down a plurality of times along the movement direction thereof are formed at two locations with a space therebetween (bellows shape).

That is, when the introduction plate 8 having the bent portions 8A moves, the bent portions 8A having a spring effect slightly rubs the surface of the glass plates, so that adhesion of solder to the glass surfaces is enhanced, thus providing an effect of reliably ensuring airtightness of the gap V.

In addition, the introduction plate 8 may have a bow shape providing a spring effect, or may have a planar shape having no bent portions. However, for the above reason, the introduction plate 8 having the bent portions 8A is more advantageous.

Meanwhile, the movement mechanism 13 moves at a constant speed on the rail members 12 along the peripheral portion V1 of the pair of glass plates 1A, 1B. Therefore, with the introduction plate 8 inserted into the gap V from an opened end part 14 of the pair of glass plates 1A, 1B, the periphery sealing metal material 3 moves into the entire area of the peripheral portion V1 of the pair of glass plates 1A, 1B via the introduction plate 8. Thus, the peripheral portion V1 of the gap V formed between the pair of glass plates 1A, 1B is sealed in an airtight state by the periphery sealing metal material 3.

Figure 6:
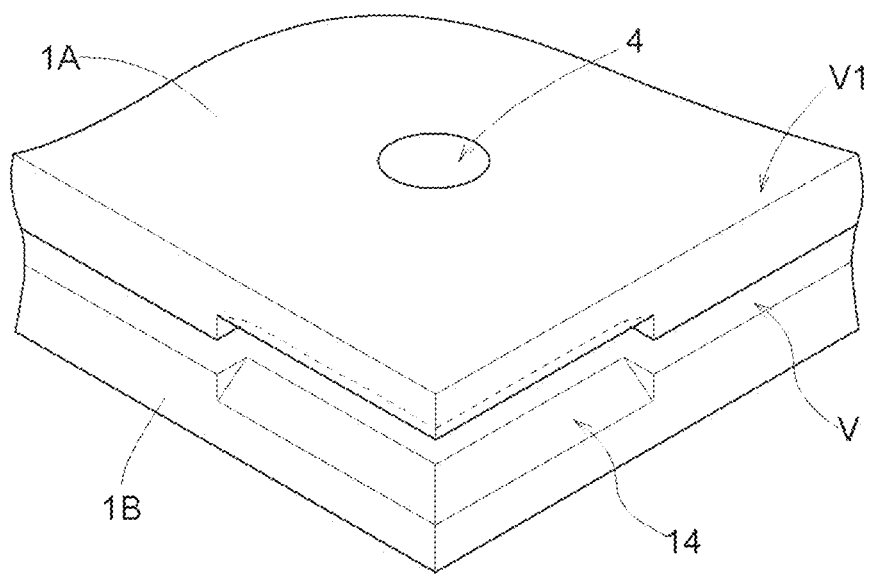
FIG. 6 is an enlarged view around the suction hole before sealing of the suction hole.

As shown in FIG. 6, the opened end part 14 is provided at a corner of the glass panel P, and is formed by chamfering gap-V-side corner portions of the pair of glass plates 1A, 1B so as to facilitate insertion of the introduction plate 8 into the gap V.

In subsequent step S36, in the vicinity of the suction hole 4, an exhaust cup is attached to the atmospheric-side main surface of the glass plate 1A so as to cover the suction hole 4, and vacuuming is performed in which gas molecules in the gap V are discharged to outside so as to reduce the pressure of the gap V to 1.33 Pa or lower through suction by a rotary pump or a turbomolecular pump (not shown) connected to the exhaust cup (step S36).

It is noted that the pump used in this step is not limited to the above-described rotary pump or turbomolecular pump, but may be any pump that can be connected to the exhaust cup and can perform suction.

Next, the suction hole sealing metal material 15 is dropped so as to overlay the suction hole 4, whereby the glass surface in the vicinity of the suction hole 4 and the suction hole sealing metal material 15 are adhered to each other to make sealing (step S37).

Thus, the gap V formed between the pair of glass plates 1A, 1B is sealed up.

It is noted that, among the above steps, the steps from cleaning of the main surfaces of the pair of glass plates 1A, 1B (step S33) to sealing by adhering the glass surface in the vicinity of the suction hole 4 and the suction hole sealing metal material 15 (step S37) are each performed in a space in which the contamination state of the air can be chemically or physically controlled.

In the present embodiment, the pair of glass plates 1A, 1B are cleaned using the liquid cleaning method. However, without limitation thereto, the pair of glass plates 1A, 1B may be cleaned using at least one of a pure water brush cleaning method, an ultrasonic cleaning method, an alkaline water cleaning method, a heating cleaning method, a vacuum (frozen) cleaning method, a UV cleaning method, an ozone cleaning method, and a plasma cleaning method. Thus, occurrence of gas molecules that can be decomposed or scattered from the main surfaces of the pair of glass plates 1A, 1B can be suppressed, and therefore the initial performance of the glass panel P can be exhibited over a long period.

In the present embodiment, as the periphery sealing metal material 3, solder having a melting temperature of 250° C. or lower, e.g., solder obtained by adding Ti to solder having a composition of 91.2Sn-8.8Zn (eutectic temperature: 198° C.) is used to seal the peripheral portion V1 of the pair of glass plates 1A, 1B. However, the periphery sealing metal material 3 (solder) is not limited thereto. The peripheral portion V1 of the pair of glass plates 1A, 1B may be sealed using a sealing material that has a melting temperature of 250° C. or lower and that is a metal material including at least one material selected from a group consisting of Sn, Cu, In, Bi, Zn, Pb, Sb, Ga, and Ag.

In addition, the periphery sealing metal material 3 may include, instead of Ti or in addition to Ti, at least one material selected from a group consisting of Al, Cr, and Si. This can improve adhesion between the periphery sealing metal material 3 and the glass component of the pair of glass plates 1A, 1B.

In the present embodiment, as the suction hole sealing metal material 15, solder having a melting temperature of 250° C. or lower, e.g., solder obtained by adding Ti to solder having a composition of 91.2Sn-8.8Zn (eutectic temperature: 198° C.) is used to seal the suction hole 4. However, the suction hole sealing metal material 15 (solder) is not limited thereto. The suction hole 4 may be sealed using a sealing material that has a melting temperature of 250° C. or lower and that is a metal material including at least one material selected from a group consisting of Sn, Cu, In, Bi, Zn, Pb, Sb, Ga, and Ag.

It is noted that, in the case of selecting Sn, it suffices that the amount thereof is 90% or higher, and in the case of Sn with Cu added thereto, the amount of Cu needs to be 0.1% or lower.

In addition, the suction hole sealing metal material 15 may include, instead of Ti or in addition to Ti, at least one material selected from a group consisting of Al, Cr, and Si.

Further, as the suction hole sealing metal material 15, solder having a component different from the periphery sealing metal material 3 may be used.

It is noted that containing Ti (titanium) in the suction hole sealing metal material 15 or the periphery sealing metal material 3 improves close adhesion to glass.

In the present embodiment, the pressure of the gap V is reduced to 1.33 Pa or lower. However, without limitation thereto, the pressure of the gap V may be reduced to reach almost a vacuum. This can further enhance thermal insulation performance of the glass panel P.

In the present embodiment, the lower limit of a thickness Tg of each of the pair of glass plates is 0.3 mm or greater. In addition, the lower limit is preferably 0.5 mm or greater. Further preferably, the lower limit is 1 mm or greater. If the thickness Tg of each of the pair of glass plates is small, the heat storage capacity of the glass itself becomes small. Therefore, at the time of periphery sealing, the amount of heat dissipation to the air per unit time increases, so that the periphery sealing metal material 3 is more readily cooled. Thus, solidification of the melted periphery sealing metal material 3 can be promoted. However, if the glass plate is thinned, rigidity of the glass plate reduces, and thus the amount of deformation of the glass plate due to the same magnitude of external force increases. Therefore, in the glass panel P, tensile stress occurring in the vicinity of a gap-side surface of the suction hole 4 increases.

The upper limit of the thickness Tg of each of the pair of glass plates is 15 mm or less. Preferably, the upper limit is 12 mm or less. Further preferably, the upper limit is 10 mm or less. In the case of using a thick glass plate, rigidity of the glass plate increases, and thus the amount of deformation of the glass plate due to the same magnitude of external force decreases. Therefore, in the glass panel P, tensile stress occurring in the vicinity of a gap-side surface of the suction hole 4 reduces, and thus long-term durability is improved. On the other hand, if the glass plate thickness Tg increases, the amount of the suction hole sealing metal material 15 flowing into the suction hole 4 at the time of sealing the suction hole is decreased. Thus, protrusion of the suction hole sealing metal material 15 on the gap side is reduced, so that it becomes difficult to relax tensile stress occurring in the vicinity of the gap-side surface of the suction hole 4.

The pair of glass plates 1A, 1B are float glass, but are not limited thereto. In accordance with the intended usage as described above, various types of glass such as figured glass, frosted glass having a light diffusing function due to surface treatment, wire mesh glass, a wire glass plate, tempered glass, double-tempered glass, low-reflection glass, high-transmission glass plate, a ceramic glass plate, special glass having a function of absorbing heat rays or ultraviolet rays, or a combination thereof, can be appropriately selected and used as the pair of glass plates 1A, 1B.

Further, also regarding the composition of the pair of glass plates 1A, 1B, soda silicate glass, soda-lime glass, borosilicate glass, aluminosilicate glass, various crystallized glasses, or the like can be used.

In the present embodiment, the opened end part 14 is formed by chamfering gap-V-side corner portions of the glass plates 1A, 1B in a planar shape. However, without limitation thereto, any shape that allows the introduction plate 8 to be easily inserted, e.g., curved-surface chamfers, can be appropriately selected and provided to the glass plates 1A, 1B. In the present embodiment, the spacer pitch Pd is 5 to 100 mm, preferably 5 to 80 mm, and further preferably 5 to 60 mm.

In addition, the spacer 2 is formed from stainless steel, but is not limited thereto. The spacer 2 may be formed from a high-rigidity material, e.g., Inconel, metal such as iron, aluminum, tungsten, nickel, chromium, or titanium, an alloy such as carbon steel, chrome steel, nickel steel, nickel chrome steel, manganese steel, chrome manganese steel, chrome molybdenum steel, silicon steel, brass, solder, or duralumin, ceramic, glass, etc. In addition, the shape of the spacer 2 is not limited to a columnar shape, but may be various shapes such as an angled shape or a spherical shape.

In the present embodiment, a gap height Vh is 30 μm to 1 mm. It is noted that the gap height Vh is substantially the same as the height of the spacer 2.

It is noted that, in the gap V, an evaporable getter may be used for adsorbing gas molecules in the gap V, a non-evaporable getter which adsorbs and removes gas molecules by being heated and activated may be used, or a non-evaporable getter and an evaporable getter may be used in combination. In addition, in the gap V, getter materials (adsorbents) and adsorbent storage holes may be provided at two or more locations.

In the present embodiment, the periphery sealing metal material 3 is formed using the metal introduction device 5, but another method may be used. The periphery sealing metal material 3 may be formed using at least one joining method of anodic bonding, ultrasonic welding, multistage welding, laser welding, and pressure bonding. Thus, adhesion of the periphery sealing metal material 3 to the pair of glass plates 1A, 1B can be improved.

In addition, a width Rw of the periphery sealing metal material 3 as seen in the thickness direction with respect to the plane of the glass panel P is not less than 1 mm and not greater than 10 mm. If the width Rw is less than 1 mm, it is difficult to keep the sealing of the gap V of the glass panel P. In addition, if the width Rw is greater than 10 mm, the amount of heat exchange occurring through the periphery sealing metal material 3 becomes excessive. Further preferably, the width Rw is not less than 1 mm and not greater than 5 mm. In this case, it is possible to keep the sealing of the gap V of the glass panel P and in addition, reduce the amount of heat exchange.

In the present embodiment, a part of the suction hole sealing metal material 15 that protrudes from the atmospheric-side surface of the glass plate 1A after sealing is referred to as a first protruding portion 15a. A first protruding portion diameter Dw (which is the same as the width of a contact portion 33 in contact with the glass plate 1A in FIG. 1) of the first protruding portion 15a is 2 to 30 mm. Further preferably, the first protruding portion diameter Dw is 2 to 15 mm. It is noted that, in any case, the first protruding portion diameter Dw is greater than a suction hole diameter Sw described later.

In addition, a first protruding portion thickness Dg of the first protruding portion 15a is 0.1 to 20 mm. Preferably, the first protruding portion thickness Dg is 0.1 to 10 mm.

In the present embodiment, the suction hole diameter Sw is 2 to 10 mm. Preferably, the suction hole diameter Sw is 2 to 5 mm. In the case of tempered glass, it is desirable that the suction hole diameter Sw is greater than the glass thickness and is not greater than 10 mm. This is for passing air through the suction hole 4 at the time of air-quenching tempering.

In addition, at least a lower edge portion of the suction hole 4 may be formed in a curved-surface shape or may be chamfered (a minute surface may be provided at the edge portion).

Figure 7:
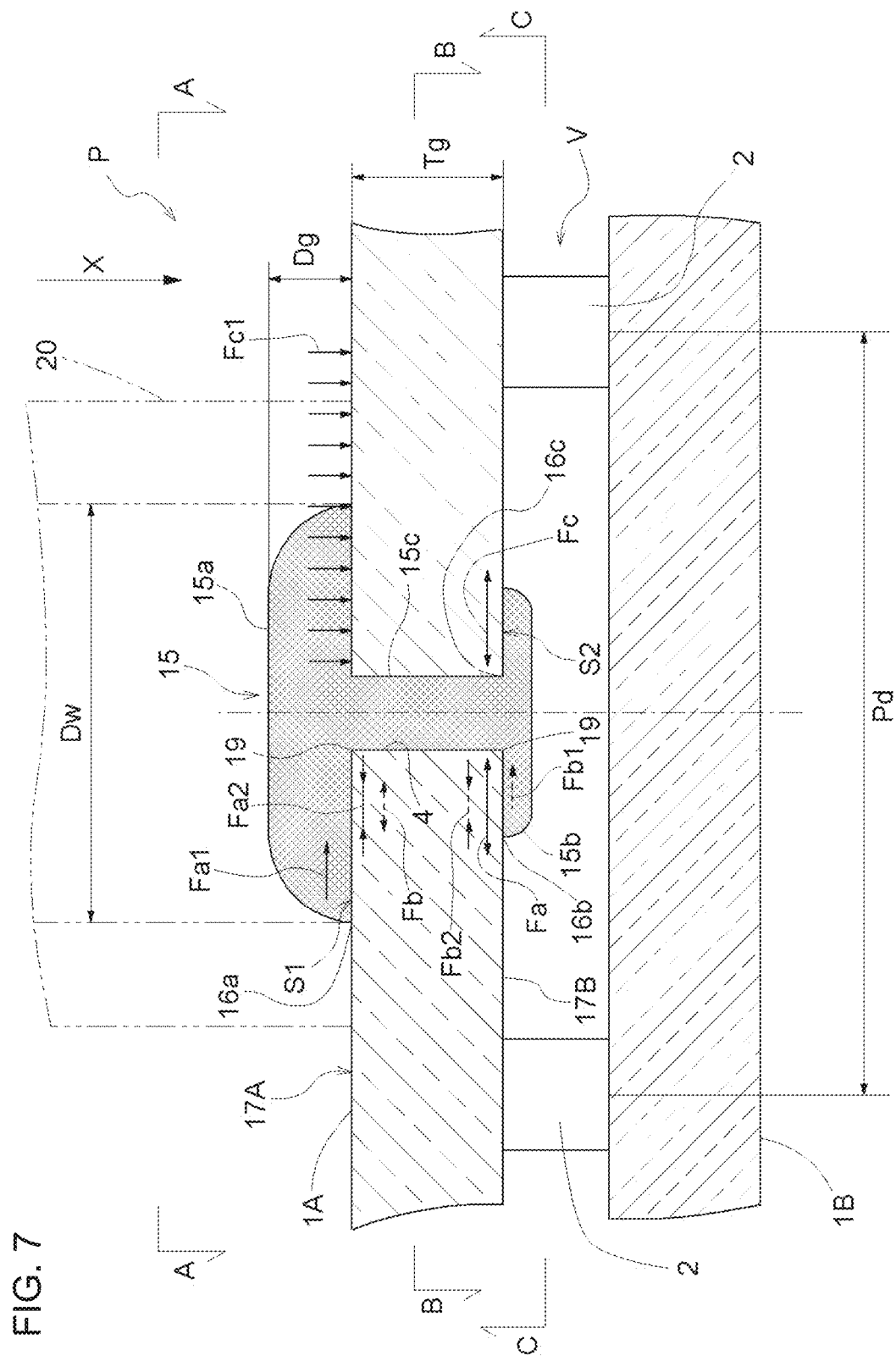
FIG. 7 is an enlarged sectional view around the suction hole after sealing of the suction hole.
Figure 12:
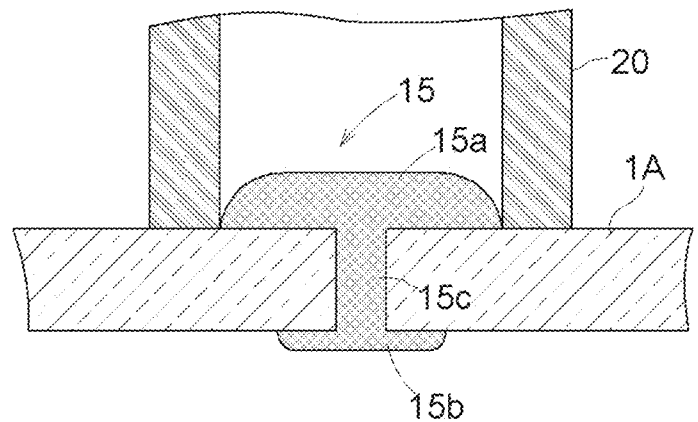
FIG. 12 is a partial enlarged sectional view of FIG. 7.

At the time of sealing the suction hole, as shown in FIG. 7 and FIG. 12, the suction hole sealing metal material 15 drops due to the own weight through the inside of a guide cylinder 20, by a mass of solder provided at an upper part of the guide cylinder 20, a heater for heating and melting the solder, and a dropping device for dropping the melted solder. The melted solder spreads on an atmospheric-side surface 17A of the glass plate 1A to form the first protruding portion 15a along the inner circumference of the guide cylinder 20, and partially sinks into the suction hole 4 to become a suction hole portion 15c. The surplus suction hole sealing metal material 15 becomes a second protruding portion 15b protruding to the gap V side. The suction hole 4 is sealed mainly by close adhesion between the first protruding portion 15a and the glass plate 1A.

The spacers 2 called pillars, shown in FIG. 7, are arranged at predetermined intervals (spacer pitch Pd) in a matrix form along the planes of the pair of glass plates 1A, 1B. These spacers 2 maintain the gap V against an atmospheric pressure Fc1, and hamper heat conduction between the pair of glass plates 1A, 1B. The atmospheric pressure Fc1 is applied to the pair of glass plates 1A, 1B supported by the spacers 2, so that a third tensile stress Fc occurs in the vicinity of a gap-side surface 17B of the glass plate 1A.

During sealing of the suction hole 4, when the melted suction hole sealing metal material 15 in a liquid state undergoes phase transition to a solid phase and is cooled, the suction hole sealing metal material 15 attempts to reduce in volume and contract. At the same time, the glass plates also attempt to contract. Here, the thermal expansion coefficient (e.g., in the case of float glass, generally 8 to $9 \times 10^6$/° C. (ordinary temperature to 350° C.)) of the glass plate 1A is smaller than the thermal expansion coefficient (e.g., $24 \times 10^6$/° C.) of the suction hole sealing metal material 15. Therefore, the volume reduction amount of the glass plate 1A is smaller than the volume reduction amount of the suction hole sealing metal material 15. Thus, the suction hole sealing metal material 15 causes an external force so as to contract in a contact surface with the glass plate 1A, and as a reaction force thereto, compressive stress occurs in a surface in the vicinity of the contact surface of the glass plate 1A.

Figure 8:
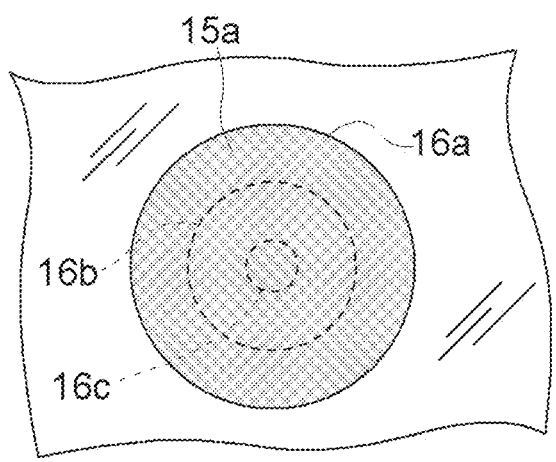
FIG. 8 is a sectional view along line A-A in FIG. 7.

As shown in FIG. 8, a first contour 16a is located on the outer side with respect to a third contour 16c, and therefore the suction hole sealing metal material 15 is in close contact with the atmospheric-side surface 17A of the glass plate 1A. Therefore, as shown in FIG. 7, a force in a contracting direction is applied as a first external force Fa1 to a first adhesion surface portion S1 where the atmospheric-side surface 17A of the glass plate 1A and the suction hole sealing metal material 15 are in contact with each other, so that first compressive stress Fa2 occurs in the vicinity of the atmospheric-side surface 17A of the glass plate 1A. Due to occurrence of the first compressive stress Fa2, as a reaction force thereto, first tensile stress Fa occurs in the vicinity of the gap-side surface 17B at a part around the suction hole 4. Accordingly, the vicinity of the gap-side surface 17B at the part around the suction hole 4 has the highest fragility in the entire glass panel P.

Figure 9:
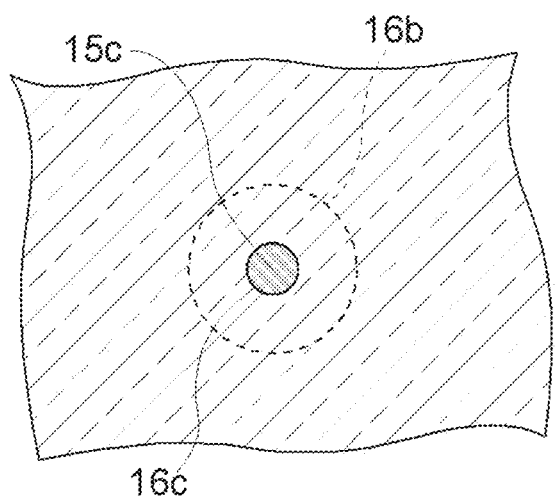
FIG. 9 is a sectional view along line B-B in FIG. 7.
Figure 10:
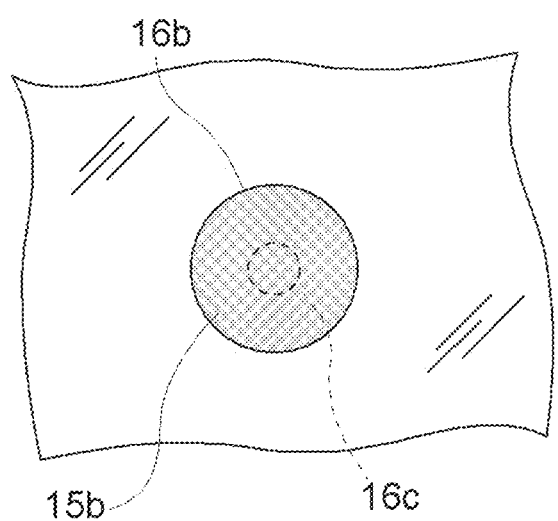
FIG. 10 is a sectional view along line C-C in FIG. 7.

In addition, as shown in FIGS. 9 and 10, also regarding a second contour 16b, the second contour 16b is located on the outer side with respect to the third contour 16c, as with the first contour 16a, and therefore the suction hole sealing metal material 15 is in close contact with the gap-side surface 17B. Therefore, as shown in FIG. 7, a force in a contracting direction by the suction hole sealing metal material 15 is applied as a second external force Fb1 to a second adhesion surface portion S2 where the gap-side surface 17B of the glass plate 1A and the suction hole sealing metal material 15 are in contact with each other, so that a second compressive stress Fb2 occurs in the vicinity of the gap-side surface 17B of the glass plate 1A. In reaction to the second compressive stress Fb2, second tensile stress Fb occurs in the vicinity of the atmospheric-side surface 17A at the part around the suction hole 4.

Accordingly, stress occurring in the vicinity of the gap-side surface 17B at the part around the suction hole 4 of the glass plate 1A, where the fragility is highest in the glass panel P, is composed of the first tensile stress Fa due to contraction of the first protruding portion 15a, the second compressive stress Fb2 due to contraction of the second protruding portion 15b, and third tensile stress Fc due to the atmospheric pressure Fc1. Therefore, regarding the magnitude of stress, the second compressive stress Fb2 is subtracted from the tensile stress (Fa+Fc), so that the stress is relaxed by the second protruding portion 15b. That is, the long-term durability of the entire glass panel P is improved.

In addition, the viscosity and the surface tension of the suction hole sealing metal material 15 greatly influence formation of the first protruding portion 15a and the second protruding portion 15b. Increase in the viscosity decreases the amount of the suction hole sealing metal material 15 that flows into the suction hole 4 at the time of sealing the suction hole. In particular, in the case where the diameter of the suction hole 4 is small, it is preferable to use the suction hole sealing metal material 15 having low viscosity. If the first protruding portion 15a becomes large, stress F increases. Therefore, it is desirable that the surface tension is great. On the other hand, if the first protruding portion 15a becomes small, the suction hole 4 cannot be sufficiently sealed. Therefore, it is desirable that the surface tension is small. Accordingly, the viscosity of the suction hole sealing metal material 15 at the melting point is preferably 4 mPa·s or lower (further preferably 3 mPa·s or lower), and the surface tension is preferably 300 to 600 mN/m (further preferably 310 to 520 mN/m). When the suction hole sealing metal material 3g heated to 230 to 240° C. is dropped from a height of 30 mm onto the glass heated to 180° C., the contact angle of the suction hole sealing metal material is preferably 30 to 90 degrees.

Figure 13:
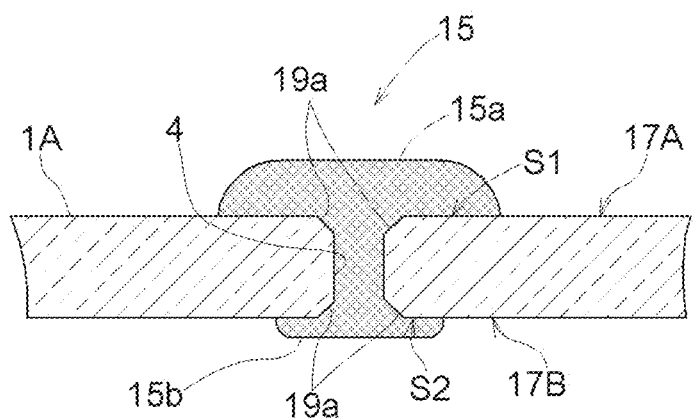
FIG. 13 is a major part sectional view in the case where chamfered portions are formed at edge portions of the suction hole.
Figure 14:
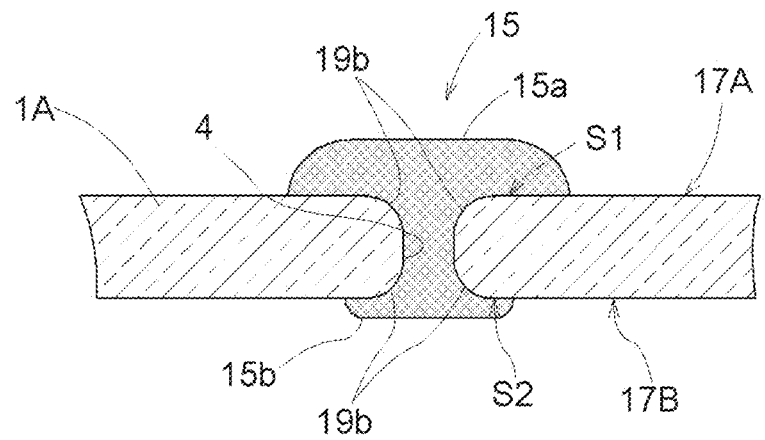
FIG. 14 is a major part sectional view in the case where curved-surface portions are formed at edge portions of the suction hole.

Further, if at least a gap-side edge portion 19 of the suction hole 4 is formed in a curved-surface shape or is chamfered, it is considered that tensile stress due to the external force is dispersed as compared to the case where the gap-side edge portion 19 is formed in a rectangular shape as shown in FIG. 7. Thus, the long-term durability of the entire glass panel P can be improved. It is noted that, as shown in FIGS. 13 and 14, a chamfered portion 19a or a curved-surface portion 19b may be formed not only at the gap-side edge portion 19 of the suction hole 4 but also at a front-surface-side edge portion 19. In addition, in such a case, the chamfered portion 19a and the curved-surface portion 19b may be formed in combination at the front-surface-side and gap-side edge portions of the suction hole 4.

In general, in the case where the suction hole sealing metal material 15 and the glass plate are closely adhered to each other by the suction hole sealing metal material 15 being solidified after melted, the adhesion surface thereof becomes substantially a mirror surface with metallic luster.

However, as shown in FIG. 11, after the suction hole 4 is sealed by the suction hole sealing metal material 15, a poorly adhered part, which is referred to as white haze 18 with no metallic luster, can exist at the contact surface between the suction hole sealing metal material 15 and the glass plate 1A.

Here, the white haze 18 is considered to be a phenomenon in which, for example, impurities, gas, and the like are deposited at the contact surface between the suction hole sealing metal material 15 and the glass plate 1A so that this part appears white due to diffused reflection. If this exists, close adhesion at this part might become insufficient due to the impurities, gas, and the like, and after elapse of a long period, the sealing is highly likely to be broken as compared to a closely adhered part with no white haze 18.

Therefore, presence/absence of the white haze 18 in the first contact surface portion S1 and the location where the white haze 18 exists in the first contact surface portion S1 greatly influence the long-term durability of the glass panel P.

That is, if, in the contact surface between the suction hole sealing metal material 15 and the glass plate 1A, the white haze 18 exists continuously from the first contour 16*a* on the outermost side on the atmospheric-side surface 17A to the second contour 16*b* on the outermost side on the gap-side surface 17B, the close-adhesion force reduces with elapse of a long period, so that outside and the gap V communicate with each other through the white haze 18 and thus it becomes difficult to keep the depressurized state of the gap V.

Accordingly, it is important to check the first contact surface portion S1. As shown in FIGS. 8 to 10, in the glass panel P of the present application, the first contour 16*a* is located on the outer side with respect to the second contour 16*b*. Therefore, it is possible to confirm the condition such as presence/absence of the white haze 18 by observing the first contact surface portion S1 from the glass plate 1B side where the suction hole 4 is not provided.

Figure 11A:
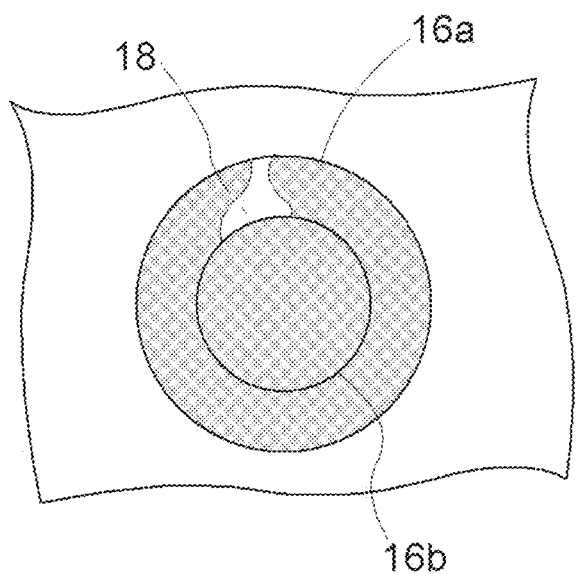
FIG. 11A is a view showing the case where white haze occurring in a contact surface between a suction hole sealing metal material and a glass plate continuously exists from a first contour to a second contour.
Figure 11B:
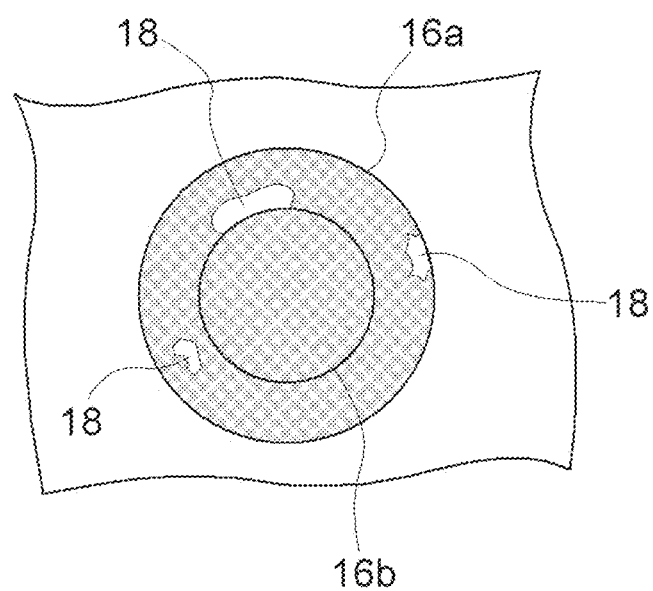
FIG. 11B is a view showing the case where white haze occurring in the contact surface between the suction hole sealing metal material and the glass plate is not continuous.

At this time, as shown in FIG. 11A, in the case where the white haze 18 is adjacent to the first contour 16*a* and the second contour 16*b* at the same time, there is a possibility that outside and the gap V communicate with each other through the white haze 18. Therefore, as shown in FIG. 11B, if the white haze 18 is not adjacent to the first contour 16*a* and the second contour 16*b* at the same time, it is ensured that outside and the gap V do not communicate with each other through the white haze 18.

It is noted that, although the reference characters have been given for convenience of matching with the drawings as described above, such reference characters are not intended to limit the present invention to the configurations shown in the accompanying drawings. In addition, it should be naturally understood that various embodiments can be made without departing from the scope of the present invention.

INDUSTRIAL APPLICABILITY

The present invention is applicable as a glass panel having high thermal insulation performance. For example, the present invention is applicable as a thermal insulation glass panel required to have long-term durability for a door, a wall part, etc., of a building or a vehicle (window glass of an automobile, a rail road vehicle, a vessel, etc.) or of various devices such as a refrigerator and a heat insulating device.

DESCRIPTION OF THE REFERENCE CHARACTERS

1A glass plate (having suction hole)
1B glass plate
2 spacer
3 periphery sealing metal material (solder)
4 suction hole
5 metal introduction device
6 surface plate
6*a* high portion
6*b* low portion
7 supply tower
8 introduction plate
8A bent portion
9 crucible portion
10 heat transfer heater
11 introduction path
12 rail member
13 movement mechanism
14 opened end part
15 suction hole sealing metal material (solder)
15*a* first protruding portion
15*b* second protruding portion
15*c* suction hole portion
16*a* first contour
16*b* second contour
16*c* third contour
17A atmospheric-side surface
17B gap-side surface
18 white haze
19 edge portion
19*a* chamfered portion
19*b* curved-surface portion
20 guide cylinder
Fa first tensile stress
Fa1 first external force
Fa2 first compressive stress
Fb second tensile stress
Fb1 second external force
Fb2 second compressive stress
Fc third tensile stress
Fc1 atmospheric pressure
P glass panel
Pd spacer pitch
Tg glass plate thickness
X plate thickness direction
V gap
V1 peripheral portion
Dw first protruding portion diameter
Dg first protruding portion thickness
S1 first contact surface portion
S2 second contact surface portion

The invention claimed is:

1. A glass panel comprising:
a pair of glass plates opposed to each other;
a gap formed by a plurality of spacers being provided at a constant pitch between the pair of glass plates; and
a periphery sealing metal material joining the pair of glass plates at a peripheral portion thereof so as to seal the gap in an airtight state, wherein
one of the pair of glass plates has a suction hole penetrating in a plate thickness direction and for sucking gas in the gap, and a suction hole sealing metal material sealing the suction hole in a state in which the gap is depressurized,
the suction hole sealing metal material has a first protruding portion formed on an atmospheric side around the suction hole, and a second protruding portion formed on a gap side around the suction hole,
as seen in a thickness direction of the glass plate, a first contour which is an outermost edge of a first adhesion surface portion where the first protruding portion is in contact with an atmospheric-side surface of the glass plate, and a second contour which is an outermost edge of a second adhesion surface portion where the second protruding portion is in contact with a gap-side surface of the glass plate, are on an outer side of a third contour which is a gap-side hole edge of the suction hole, and a viscosity of the suction hole sealing metal material at a melting point thereof is 4 mPa·s or lower, and a surface tension thereof is 300 mN/m or greater and 600 mN/m or lower.

2. The glass panel according to claim 1, wherein the first contour is on an outer side of the second contour.

3. The glass panel according to claim 1, wherein in a contact surface between the first protruding portion and the glass plate, a white haze part with no metallic luster is not in contact with at least the first contour or the second contour.

4. The glass panel according to claim 1, wherein a diameter of the suction hole is 2 to 10 mm.

5. The glass panel according to claim 1, wherein at least a lower edge portion of the suction hole is formed in a curved-surface shape or is chamfered.

6. The glass panel according to claim 1, wherein a width of the periphery sealing metal material as seen in the thickness direction of the glass panel is 1 to 10 mm.

7. The glass panel according to claim 1, wherein a thickness of at least one of the pair of glass plates is 0.3 to 15 mm.

8. The glass panel according to claim 1, wherein a width of the first protruding portion is 2 to 30 mm.

9. The glass panel according to claim 1, wherein a thickness of the first protruding portion is 0.1 to 20 mm.

10. The glass panel according to claim 1, wherein the pitch of the spacers is 5 to 100 mm.

11. The glass panel according to claim 1, wherein an outer circumference of the first protrusion is curved from the first contour to a portion farthest from the atmospheric-side surface in a cross-sectional view.

12. The glass panel according to claim 1, wherein an outer circumference of the second protrusion is curved from the second contour to a portion farthest from the gap-side surface in a cross-sectional view.

13. The glass panel according to claim 1, wherein the second protrusion has a first portion directly below the suction hole and a second portion outside the first portion, wherein the second portion has a surface in contact with the gap-side surface and another surface facing but not in contact with the one of the pair of glass plates that does not have the suction hole.

* * * * *